(No Model.)
W. H. THOMPSON.
ROLLER BEARING FOR SHEAVES.
No. 504,287.           Patented Aug. 29, 1893.
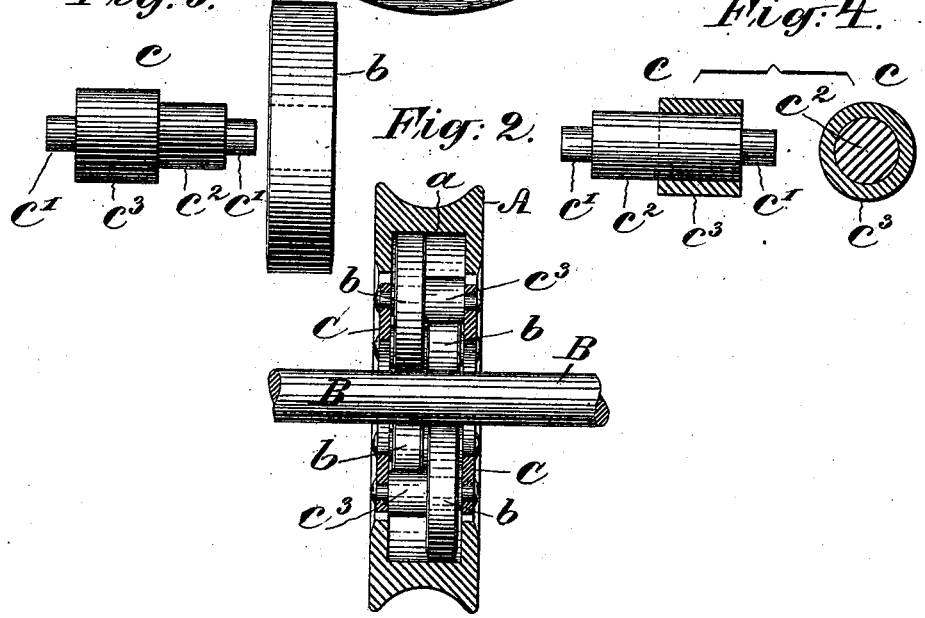
WITNESSES:
INVENTOR:
William H. Thompson.
By Henry Connett
Attorney.

UNITED STATES PATENT OFFICE.

WILLIAM H. THOMPSON, OF MORRISTOWN, NEW JERSEY, ASSIGNOR TO JOHN S. W. THOMPSON, OF SAME PLACE.

ROLLER-BEARING FOR SHEAVES.

SPECIFICATION forming part of Letters Patent No. 504,287, dated August 29, 1893.

Application filed May 26, 1893. Serial No. 475,608. (No model.)

*To all whom it may concern:*

Be it known that I, WILLIAM H. THOMPSON, a citizen of the United States, residing at Morristown, in the county of Morris and State of New Jersey, have invented certain new and useful Improvements in Roller-Bearings for Sheaves and the Like, of which the following is a specification.

My invention relates to rolling bearings for sheaves, wheels, pulleys, &c., of the class wherein two sets of rollers are employed, the rollers of one set overlapping those of the other.

In this class of roller bearings, as applied to sheaves for pulley blocks, the rollers, bearing outwardly against an interior surface of the sheave, rotate about pintles fixed in retaining rings at their ends, the sets of rollers being embraced between said rings.

In practice it is found that the slipping of the rollers laterally along the pintles causes the overlapping rollers of the respective sets to rub and chafe against each other, the trouble being greatly increased by the movement in opposite directions of the surfaces in contact.

The object of my invention is to so mount the rollers that those of one set cannot chafe against those of the other set, and to compel the rollers of each set to track in their travel within the hollow rim of the sheave or wheel.

The accompanying drawings fully illustrate an embodiment of my invention as applied to a sheave such as is used in pulley blocks.

Figure 1 is a side view of a sheave, provided with my roller bearing, part of the sheave and a part of one of the roller-retaining rings being broken away so as to better illustrate the invention. Fig. 2 is a transverse, vertical section of the sheave and being seen in Fig. 1. Fig. 3 shows a roller and pintle, on a larger scale than the principal figures, and separate. Fig. 4 illustrates a slight variation in the construction of the pintle.

A represents the sheave, and B, a rod about which the sheave rotates. Ordinarily this rod is fixed or non-rotative. The sheave, which is in the form of an annulus, has formed in it a concentric, circular track, $a$, on which the rollers, $b$, bear and roll at their outer peripheries, said rollers bearing interiorly on the cylindrical rod, B, in the axis of the sheave. The rollers $b$, rotate about pintles, $c$, which are fixed at their respective ends in the retaining rings C. The pintles are shouldered so as to carefully distance the rings, and they will be fixed non-rotatively in the latter, preferably by riveting down their ends. The rollers, $b$, are in sets, two sets being employed in the construction shown herein; and the rollers of one set alternate with those of the other set and overlap them, as clearly shown.

The construction of the pintle $c$, is clearly illustrated in Fig. 3. It has reduced extremities, $c'$, which find lodgment in the respective rings C, a journal, $c^2$, on which the roller $b$ rotates, and a distancing boss or collar, $c^3$, which prevents the sliding of the roller laterally along the pintle and compelling it to roll in a straight line or path. In setting the pintles they are alternately reversed endwise so that the roller on the journal $c^2$, of one pintle will be opposite the boss $c^3$, of the next adjacent pintle, as clearly shown. This construction enables the lateral, contiguous faces, of two rollers to be brought near together without danger of their chafing or rubbing the one on the other. This collar or boss for distancing the rollers may be formed integrally with the pintle, or it may be made from a tube and slipped on the pintle. This latter construction is represented in Fig. 4 where the tubular boss is represented in both longitudinal and transverse section. Where the sleeve-like boss is not secured to the pintle it should be long enough to occupy all the space between the roller and the ring C at that side. Where there are but two sets of rollers, I prefer the integral construction of Fig. 3, but if a number of alternating sets of rollers are employed as there may be when the sheave or wheel is quite thick,—the construction shown in Fig. 4 will be preferable, as bosses or collars must be placed between the rollers on the same pintle to distance them.

It will be obvious that the roller bearing may be applied to other rolling parts than sheaves, as for example in caster-rollers for safes and the like, and I do not limit myself to its use on sheaves.

A feature of the roller $b$, is the formation of a slight chamfer or bevel, seen in Fig. 3, on the sides of the roller at its periphery. This prevents the formation of a burr at this point when the bearing is subjected to heavy pressure in use. The rollers will be made by preference from case-hardened iron or hardened steel and dressed smoothly to gage. The holes in the rings C will also be drilled very accurately. As here shown there are six rollers, three in each set, but there may be more, as eight for example. The number of rollers will depend somewhat on the diameter of the sheave, pulley, or wheel provided with the bearing.

Having thus described my invention, I claim—

1. The combination, with a sheave having a circular track $a$, concentric with its axis, the retaining rings C, embracing the sets of overlapping wheels $b$, and the said wheels, of the pintles $c$, on which the respective wheels rotate mounted at their respective ends in the said rings and distancing the latter, each of said pintles having a journal $c^2$, for the wheel and a distancing boss, $c^3$, of larger diameter than the journal and of a length somewhat in excess of the thickness of the wheels in the adjacent set, whereby the overlapping wheels of the sets are prevented from chafing and rubbing against each other, as set forth.

2. The combination with a sheave having a circular track $a$, concentric with its axis, the retaining rings C, two sets of chamfered wheels $b$, embraced between the rings C, the wheels of each set being of the same thickness and the wheels of one set overlapping those of the other set, as shown, and the pintles $c$ on which the respective wheels rotate, each of said pintles being fixed non-rotatively in the respective rings C at its ends, and having a journal $c^2$, on which the wheels turn and a distancing boss $c^3$, of larger diameter than said journal, said journal and boss occupying the entire space between the rings C, and the boss being longer than the journal, substantially as set forth.

In witness whereof I have hereunto signed my name in the presence of two subscribing witnesses.

WILLIAM H. THOMPSON.

Witnesses:
JOHN S. W. THOMPSON,
HENRY C. PITNEY, Jr.